(12) United States Patent
Kramer (10) Patent No.: US 9,193,305 B2
(45) Date of Patent: Nov. 24, 2015

(54) MOVABLE UTILITY RACK

(71) Applicant: Rodney Mark Kramer, Rockford, IL (US)

(72) Inventor: Rodney Mark Kramer, Rockford, IL (US)

(73) Assignee: Rockford Process Control, Inc., Rockford, IL (US)

( * ) Notice: Subject to any disclaimer, the term of this patent is extended or adjusted under 35 U.S.C. 154(b) by 0 days.

(21) Appl. No.: 14/164,967

(22) Filed: Jan. 27, 2014

(65) Prior Publication Data

US 2014/0217140 A1 Aug. 7, 2014

Related U.S. Application Data

(60) Provisional application No. 61/759,519, filed on Feb. 1, 2013.

(51) Int. Cl.
*B60R 9/042* (2006.01)
*B60R 11/06* (2006.01)
*B60R 11/00* (2006.01)

(52) U.S. Cl.
CPC ................ *B60R 9/042* (2013.01); *B60R 11/06* (2013.01); *B60R 2011/004* (2013.01)

(58) Field of Classification Search
CPC ....................................................... B60R 9/042
USPC ........................................... 224/310; 414/462
See application file for complete search history.

(56) References Cited

U.S. PATENT DOCUMENTS

| | | | | |
|---|---|---|---|---|
| 2,715,974 A * | 8/1955 | Van Nest | ...................... | 414/462 |
| 2,931,528 A * | 4/1960 | Mabry | .......................... | 414/462 |
| 3,782,565 A * | 1/1974 | Doran et al. | ................... | 414/274 |
| 3,963,136 A * | 6/1976 | Spanke | .......................... | 414/462 |
| 4,439,086 A * | 3/1984 | Thede | ............................. | 414/462 |
| 4,484,851 A * | 11/1984 | Gottlieb et al. | ................. | 414/462 |
| 4,565,482 A * | 1/1986 | Baker | ............................ | 414/462 |
| 5,137,411 A * | 8/1992 | Eul et al. | ....................... | 414/462 |
| 5,154,563 A * | 10/1992 | Phillips | ......................... | 414/462 |
| 5,165,504 A * | 11/1992 | Lecorre | ......................... | 187/245 |
| 5,297,912 A * | 3/1994 | Levi | .............................. | 414/462 |
| 5,846,045 A * | 12/1998 | Johnson et al. | ............... | 414/462 |
| 6,698,994 B2 * | 3/2004 | Barrett | .......................... | 414/462 |
| 6,874,835 B1 * | 4/2005 | Silverness | ......................... | 296/3 |
| 7,048,490 B2 * | 5/2006 | Henderson | ..................... | 414/462 |
| 7,137,479 B2 * | 11/2006 | Ziaylek et al. | ................. | 182/127 |

(Continued)

FOREIGN PATENT DOCUMENTS

DE 19543218 A1 * 1/1997
FR 2864489 A1 * 7/2005

*Primary Examiner* — Justin Larson
(74) *Attorney, Agent, or Firm* — Reinhart Boerner Van Deuren P.C.

(57) ABSTRACT

A movable utility rack is provided. The utility rack presents an ergonomic and easily accessible configuration to a user. One embodiment of the movable utility rack includes a base frame and first and second spaced apart track assemblies mounted on the base frame. The first and second spaced apart track assemblies have a curved shape and each define a channel at a first radius of curvature. A first support member is carried by the first track assembly within the channel thereof, and a second support member is carried by the second track assembly within the channel thereof. A drive arrangement is operatively connected to the first and second support members to move the support members within the channel defined by each track assembly along an arcuate path that has a second radius of curvature that is substantially equal to the first radius of curvature.

18 Claims, 6 Drawing Sheets

(56) References Cited

U.S. PATENT DOCUMENTS

| | | | |
|---|---|---|---|
| 7,226,266 B2* | 6/2007 | Henderson et al. | 414/462 |
| 7,513,730 B2* | 4/2009 | Goyanko | 414/462 |
| 8,382,418 B2* | 2/2013 | DiVerdi | 414/462 |
| 2004/0028510 A1* | 2/2004 | Jones | 414/462 |
| 2006/0285954 A1* | 12/2006 | Neary | 414/465 |

* cited by examiner

MOVABLE UTILITY RACK

CROSS REFERENCE TO RELATED APPLICATIONS

This patent application claims the benefit of U.S. Provisional Patent Application No. 61/759,519, filed Feb. 1, 2013, the entire teachings and disclosure of which are incorporated herein by reference thereto.

FIELD OF THE INVENTION

This invention generally relates to utility racks, and more specifically utility racks for carrying equipment and supplies on an exterior of motorized and non-motorized vehicles.

BACKGROUND OF THE INVENTION

Utility racks for carrying equipment and supplies are frequently implemented on motor vehicles such as light trucks, e.g. pickup trucks, to enhance the carrying capacity of the vehicle. Advantageously, such racks allow for carrying additional equipment and supplies to a job site that the vehicle would not otherwise be able to carry. Further, such racks allow a user to forego stowing relatively long supplies in a bed of their truck, which otherwise requires the use of flags affixed to an end of the equipment overhanging the bed, or in extreme cases specialized permits and/or escorts. Indeed, the rack typically provides a mounting surface or plane which is larger than that provided by the bed alone.

These utility racks are frequently used in the context of pickup trucks and/or vans. In the context of pickup trucks, the rack extends above the bed of the truck to at or above the maximum height of the cab of the truck. In the context of vans, the rack is situated on the roof of the van so as to exceed the maximum height of the van.

In either case, the height of these racks requires the user to work over their head when retrieving or stowing equipment and supplies on the rack. Because the equipment and supplies are often times quite long, heavy and/or cumbersome, such racks can lead to a safety risk that the user might drop the equipment while retrieving/stowing the same, or injure themselves in attempting to lift the equipment to or form the rack. Indeed, shoulder and back injuries are relatively frequent with such systems.

Prior designs have attempted to address these issues by providing mechanical assist systems which aid in retrieving/stowing equipment and supplies from the rack. Such exemplary systems can be seen at U.S. Pat. No. 6,874,835 to Silverness, and U.S. Pat. No. 5,297,912 to Levi, the teachings and disclosures of which are incorporated in their entireties by reference thereto. While such systems have to some extent alleviated the aforementioned problems, they have certain disadvantages. First, the aforementioned systems such as those shown in U.S. Pat. Nos. 6,874,835 and 5,297,912 still require a user to work over their head, or at least at or above shoulder level. As such, the risk of injury is ever present. Second, the mechanism of such systems is relatively complex, driving up the cost of the same. As a result, few consumers are able to readily implement such systems in the first instance. Third, the mechanism itself, due in part to its complexity, is relatively heavy. Once a user has loaded equipment on to the rack in these designs, the user must thereafter lift the equipment, as well as the movable rack, to lock it in place. As a result, the user is in effect not only working with the weight of the equipment over their head, but also the weight of the movable portion of the rack.

In view of the foregoing, there is a need in the art for a utility rack that significantly reduces or eliminates the risk of injury by presenting an ergonomic configuration that does not require a user to work at or over shoulder/head level when retrieving or stowing items from the system. It is also desired that such a system be relatively low cost, so that it may be readily implemented.

The invention provides such a utility rack. These and other advantages of the invention, as well as additional inventive features, will be apparent from the description of the invention provided herein.

BRIEF SUMMARY OF THE INVENTION

In one aspect, the invention provides a utility rack that presents an ergonomic and easily accessible configuration to a user. An embodiment according to this aspect includes a base frame and first and second spaced apart track assemblies mounted on the base frame. The first and second spaced apart track assemblies have a curved shape and each define a channel at a first radius of curvature. A first support member is carried by the first track assembly within the channel thereof, and a second support member is carried by the second track assembly within the channel thereof. A drive arrangement is operatively connected to the first and second support members to move the support members within the channel defined by each track assembly along an arcuate path that has a second radius of curvature that is substantially equal to the first radius of curvature.

In an embodiment according to this aspect, the first and second track assemblies have a curved shape at a first radius of curvature. The first and second support members each have a curved bottom edge at a second radius of curvature that is substantially equal to the first radius of curvature. A plurality of gear teeth are formed along the curved bottom edge of each of the first and second support members.

In an embodiment according to this aspect, the drive arrangement includes an input drive coupled to a drive shaft for rotating the drive shaft in first and second rotational directions. The drive arrangement includes first and second pinion gears fixedly mounted to the drive shaft, the first pinion gear meshing with the plurality of teeth formed on the curved bottom edge of first support member, the second pinion gear meshing with the plurality of teeth formed on the curved bottom edge of the second support member. The drive arrangement can also include a slip clutch.

In an embodiment according to this aspect, each of the first and second track assemblies includes a track housing and a track guide mounted within an interior of the track housing. Each of the first and second support members includes a plurality of guide elements extending outwardly therefrom for guiding the first and second support members within the channels defined by the first and second track assemblies. The plurality of guide elements may be roller bearings, each of which makes rolling contact with a contact surface defined by the track guide of each of the first and second track assemblies.

In an embodiment according to this aspect, the movable utility rack can also include a stopping arrangement for limiting travel of the first and second support members along the arcuate path.

In another aspect, the invention provides a movable utility rack that presents a low cost configuration via the incorporation of a drive arrangement with minimized parts and complexity. An embodiment according to this aspect includes a base frame and first and second spaced apart track assemblies mounted on the base frame that each define a channel. A first support member is carried by the first track assembly within the channel thereof, and a second support member is carried by the second track assembly within the channel thereof. Such an embodiment also includes a drive arrangement with a drive shaft which is commonly connected to each of the first and second support members such that rotation of the drive shaft results in the simultaneous movement of the first and second support members along an arcuate path.

In an embodiment according to this aspect, the drive shaft is rotatable in a first rotational direction to simultaneously transition the first and second support members from a raised position to a lowered position along an arcuate path, and wherein the shaft is rotatable in a second direction to simultaneously transition the first and second support members from the lowered position to the raised position along the arcuate path.

In an embodiment according to this aspect, the movable utility rack can also include a stopping arrangement for limiting travel of the first and second support members along the arcuate path. The stopping arrangement comprises a first stop mounted at an end of each of the first and second track assemblies, the first top preventing continued movement of the first and second support members along the arcuate path beyond a fully raised position. The stopping arrangement further comprises a first stopping element formed on each of the first and second support members, and a second stopping element formed on each of the first and second track assemblies, wherein the first stopping element abuts the second stopping element to prevent continued movement of the first and second support members along the arcuate path beyond a fully lowered position.

In an embodiment according to this aspect, the drive shaft is commonly connected to the first and second support members by a first and second pinion gear, respectively, the first and second pinion gears fixedly mounted on the drive shaft for rotation therewith. Each of the first and second support members includes a lower edge with a plurality of teeth formed thereon that mesh with the first and second support members. The drive arrangement includes an input drive for rotating the drive shaft. The drive arrangement can include a slip clutch for preventing rotation of the drive shaft at a predetermined torque.

In yet another aspect, the invention provides a movable utility rack for use with a light truck such as a pickup truck that mounts to an upper-most edge region of a bed of the truck, and presents a reduced risk of injury by positioning a loading point thereof at a height below a lower-most edge region of the bed of the truck. An embodiment according to this aspect includes a base frame and first and second spaced apart track assemblies mounted on the base frame that each define a channel. A first support member is carried by the first track assembly within the channel thereof, and a second support member is carried by the second track assembly within the channel thereof. Such an embodiment also includes a drive arrangement for moving the first and second support members along an arcuate path from a raised position to a lowered position such that at least a portion of a mounting surface of each of the first and second support members is positioned below the lower-most edge region of the bed of the truck.

In yet another aspect, the invention provides a movable utility rack which incorporates a mechanical assist such that a user not required to manually lift the combined load of equipment and a portion of the rack over their head, unlike prior designs. An embodiment of a movable utility rack according to this aspect includes first and second support members which are each movable relative to a base frame of the rack along an arcuate path between a raised position and a lowered position and vice versa. A drive arrangement is provided to move the first and second support members along the arcuate path from the lowered position to the raised position such that a user is not required to manually the combined load of equipment and a portion of the rack over their head.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, an exemplary embodiment of a utility rack 20 according to the teachings of the present invention is illustrated in FIGS. 1-7. As will be explained in greater detail below, utility rack 20 advantageously is movable between a raised and a lowered configuration to permit the retrieval and loading of equipment and supplies 24. Equipment and supplies 24 are schematically illustrated herein as the same may take various forms, e.g. tools, ladders, piping, cable, etc. Utility rack 20 advantageously permits the loading and retrieval of such supplies 24 in a more ergonomic fashion than the prior designs described above by lowering the overall loading point of the rack. As a result, the risk of injury otherwise present in prior designs is minimized or eliminated entirely. Further, utility rack 20 may be readily manufactured from low cost materials and also has a reduced bill of materials such that the overall cost of utility rack 20 is significantly less than prior designs.

Utility rack 20 is illustrated mounted upon a schematic illustration of a bed 22 of a conventional light truck such as a pick-up truck. Those skilled in the art will recognize that the particular shape of bed 22 is purely exemplary and for illustrative purposed only, as it is recognized that beds of various designs may readily incorporate utility rack 20 with minimal or no alteration to the bed. Further, utility rack 20 may also be incorporated on other types of vehicles, e.g. roof top installations on vans or the like, with minor structural modification thereof.

Utility rack 20 includes a base frame 26, a pair of spaced apart track assemblies 28, 30 mounted to the base frame 26 at an uppermost extent thereof, a pair of support members 32, 34 respectively mounted in the pair of track assemblies 28, 30 as illustrated, and a drive arrangement 36 for simultaneously moving the support members 32, 34 relative to the track assemblies 28, 30 along an arcuate path 38 as illustrated.

Base frame 26 includes spaced apart longitudinal members 40 connected via spaced apart lateral members 42. Base frame 26 also includes a plurality of generally upright support members 44 at the corners formed at the intersection of longitudinal and lateral members 40, 42. Each of upright members 44 provides a connection point 46 for mounting base frame 26 to bed 22 as shown. Those skilled in the art will recognize that the particular geometry and location of each connection point 46 will vary depending upon shape and size of bed 22 or other structure to which utility rack 20 will attach. Generally, each connection point 46 may comprise a weld surface for welding, a mechanical fastener type connection, etc.

Figure 1:
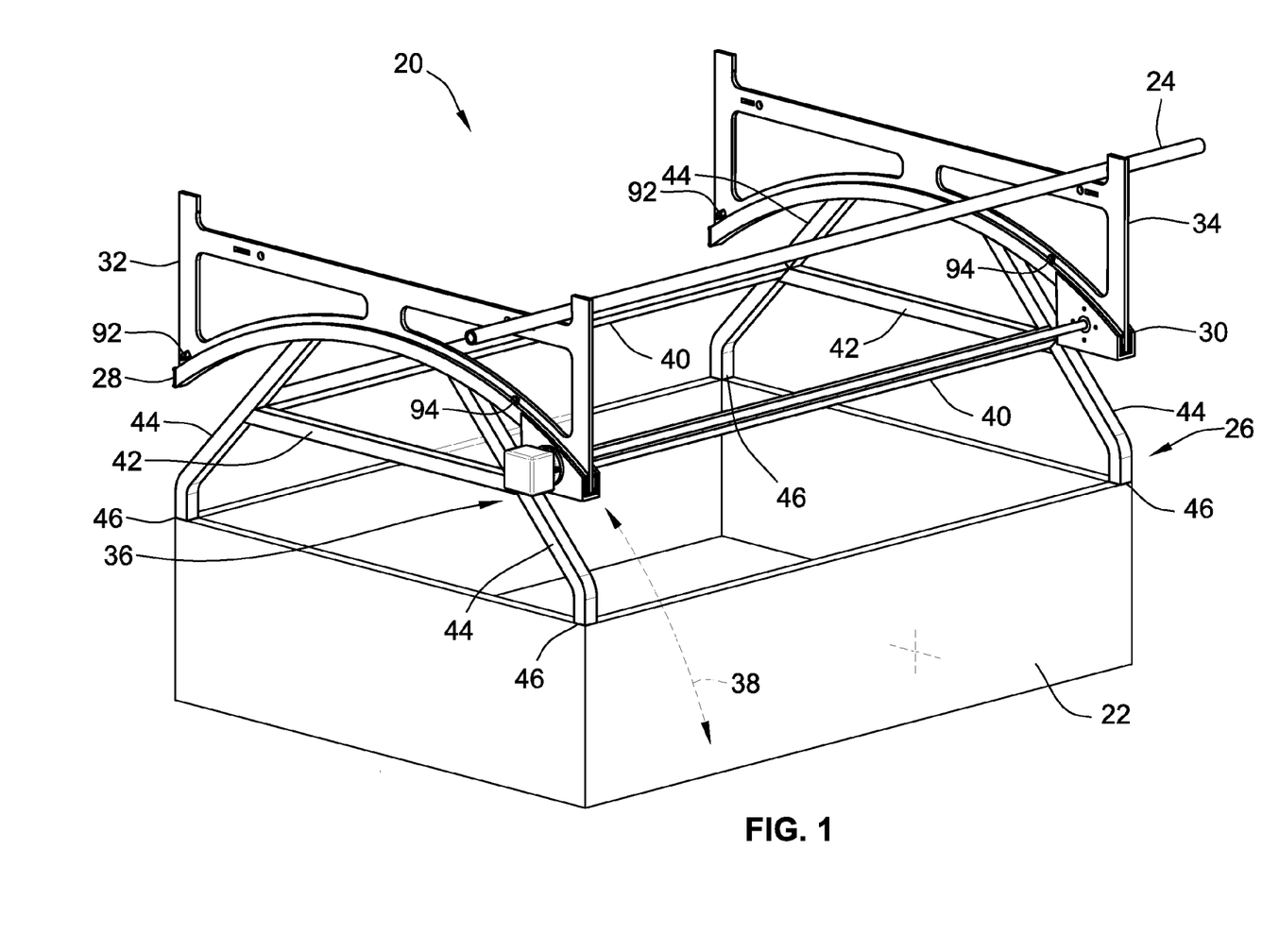
FIG. 1 is a perspective view of an exemplary embodiment of a utility rack according to the teachings of the present invention in a raised position.
Figure 2:
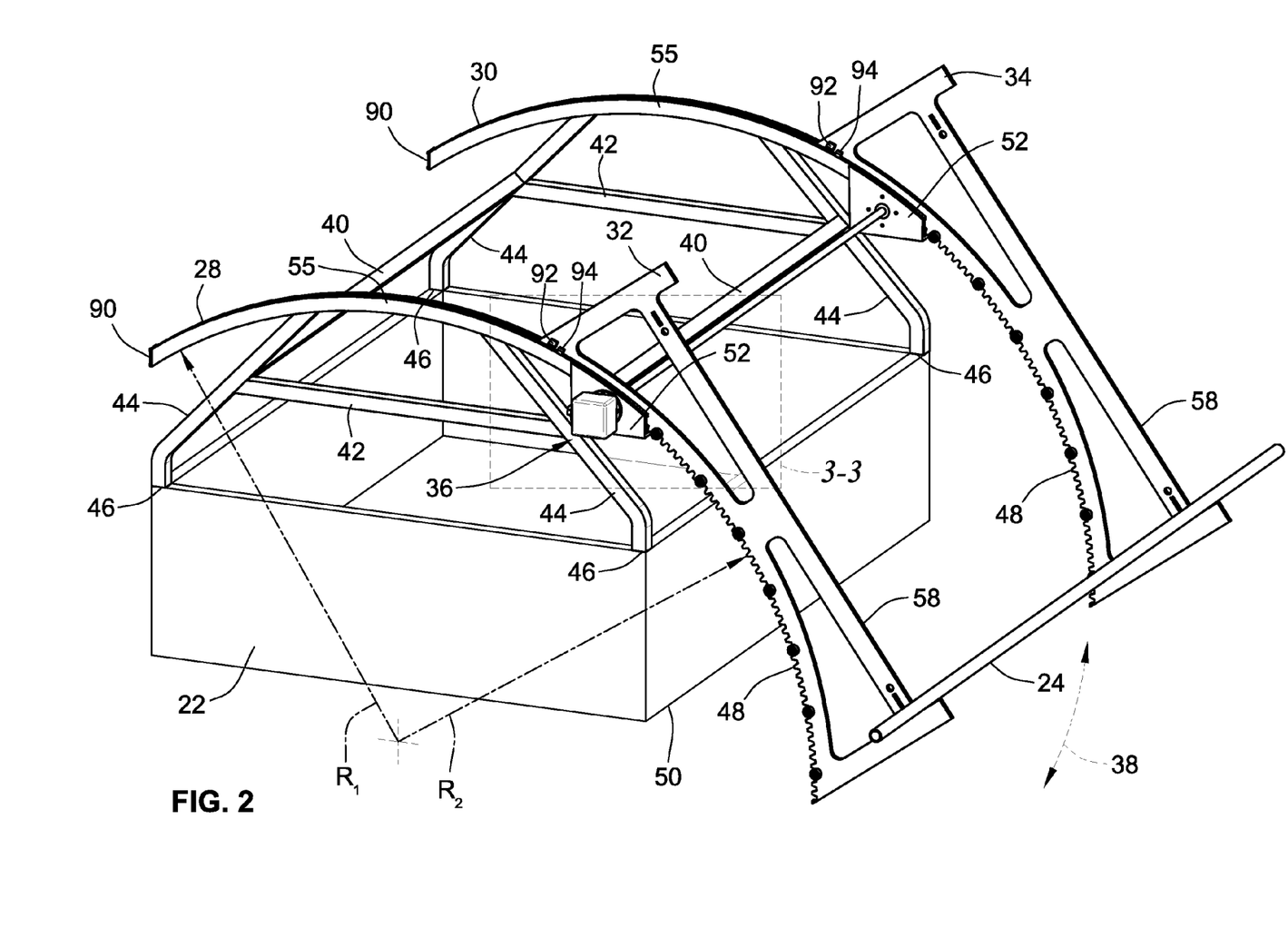
FIG. 2 is a perspective view of an exemplary embodiment of a utility rack according to the teachings of the present invention in a lowered position.

Utility rack 20 is illustrated in FIG. 1 in a raised position. In this position, equipment 24 is generally positioned vertically above bed 22 and above the typical user's shoulder/head height. With reference now to FIG. 2, utility rack 20 is shown in a fully lowered position. In this position, drive arrangement 36 has moved support members 32, 34 along arcuate path 38 so as to position at least a portion of, and more particularly a lateral extremity of, support members 32, 34 in proximity to, at, or below a lower most edge 50 of bed 22. As can be surmised from inspection of FIG. 2, equipment 24 is now positioned below shoulder/head height of a typical user and is easily accessible. In other words, a user does not have to work over their head to load or unload equipment 24 from support members 32, 34.

Support members 32, 34 are movable relative to the track assemblies 28, 30. As can be seen in FIG. 2, each track assembly 28, 30 has a curved-shape and denotes a first radius of curvature $R_1$. The lower most extents of support members 32, 34 also have a curved-shape at a second radius of curvature $R_2$ which is generally the same as the first radius of curvature $R_1$. Radii of curvature $R_1$ and $R_2$ are large enough to accommodate the upper most extents of a vehicle incorporating utility rack 20. In other words, these radii of curvature $R_1$ and $R_2$ are large enough so that during transitioning support members 32, 34 between the raised and lowered position, equipment 24 will not interfere with the upper most extents of a vehicle incorporating utility rack 20.

Each track assembly includes a track housing 52 and a track guide 55 which defines a track channel 56 (See FIG. 3) that receives its respective support member 32, 34. Those skilled in the art will recognize that the curved shape of track assemblies 28, 30 allows them to be self-draining in the event they take on water from rain, etc. Additional drainage ports may also be included, however.

Each support member 32, 34 is generally a planar structure. Each support member 32, 34 includes an upper portion that defines a mounting surface 58 for receipt of equipment 24. Proximate this mounting surface 58, slots 57, holes 59, etc. may also be provided for accommodating straps and other fixturing for securing equipment 24. Each support member 32, 34 also includes a lower portion which terminates in a lower-most edge 48 thereof. This lower most edge 48 defines the aforementioned second radius of curvature $R_2$.

Figure 3:
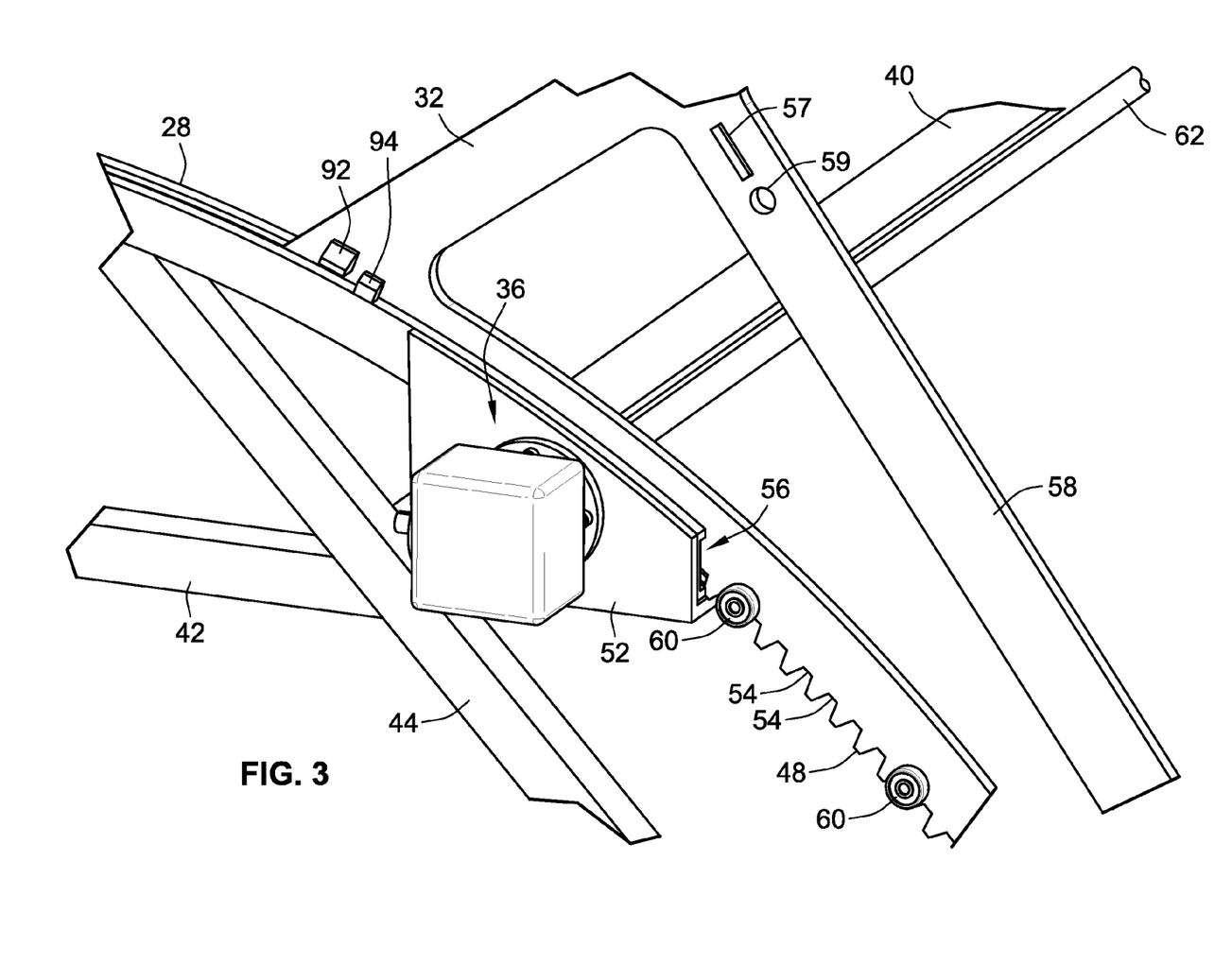
FIG. 3 is a partial perspective view a support member extending from a track assembly of the embodiment of FIG. 1.

Turning now to FIG. 3, the relationship between support member 32 and track assembly 28 is illustrated in greater detail. The interrelationship between support member 34 and track assembly 30 is the same as that described in FIG. 3. As such, and for purposes of brevity, only track assembly 28 and support member 32 are described. Support member 32 is slidable within channel 56. As will be explained in greater detail below, lower edge 48 of support member 32 includes a plurality of gear teeth 54 which engage a corresponding drive gear of drive arrangement 36. The particular geometry of the illustrated gear teeth 54 is for illustration purposes only, it being recognized that any number of gear profiles may be used depending upon the particular selection of gearing utilized in drive arrangement 36. Further, other non-geared configurations are contemplated, such as for non-limiting example roller chains, belts, cables, etc.

Support member 32 also includes a plurality of guide elements 60 which extend from either side of support member 32. Guide elements 60 present a rolling or sliding guide contact surface to stabilize the motion of support member 32 within track assembly 28. Guide elements 60 may be embodied as pins, roller bearings, or any other feature which presents a low friction surface that will contact an interior of track assemblies 28, 30 to stabilize the motion thereof. More particularly, each guide element 60 slidably contacts track guide 55 to guide support member 32 as it moves within channel 56.

Figure 4:
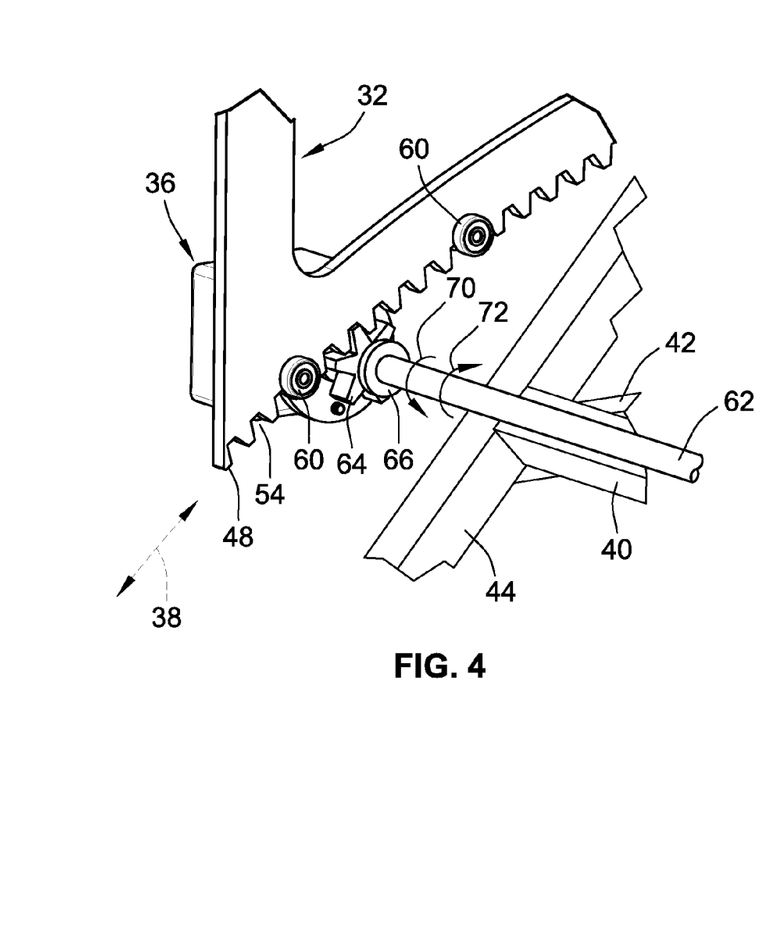
FIG. 4 is a perspective view of a portion of a drive arrangement of the embodiment of FIG. 1.

Turning now to FIG. 4, drive arrangement 36 and its constituent components as well as their interrelationship relative to support members 32, 34 will be described in greater detail. Drive arrangement 36 includes an input drive 60. Input drive 60 is schematically illustrated in FIG. 4 as it may be embodied by various components. Indeed, input drive 60 may be a hand operated or motorized worm gear which meshes with an input end of a drive shaft 62, or a non-worm gear-type drive, e.g. a conventional motorized or hand operated gear box arrangement. Input drive 60 could also include a slip clutch to prevent movement of support members 32, 34 in certain instances, such as when they are overloaded. Given the variety of components that could embody input drive 60, the same is illustrated generally schematically in FIG. 4.

As stated above, input drive 60 is in mechanical communication with an input end of drive shaft 62. A pinion gear 64 is mounted along drive shaft 62 and meshes with gear teeth 54 (See FIG. 3) formed at the bottom edge 48 of support member 32. It will also be recognized that housing 52 and track guide 55 have been removed from this view for purposes of clarity and exposing the meshed contact between pinion gear 64 and teeth 54 of support member 32. Track housing 52 includes apertures in its sidewalls for passage of drive shaft 62 through track housing 52. Track housing 52 also includes an internal cavity therein in which pinion gear 64 and a portion of drive shaft 62 are situated. An opening or other clearance feature is provided in a bottom of track guide 55 to allow for the meshing contact between pinion gear 64 and teeth 54 formed on support member 32 as shown. Additionally, drive arrangement 36 may also incorporate bushings 66 and other hardware which interact with track housing 52 (See FIG. 3) for adequate location and stabilization of drive shaft 62. Rotation of drive shaft 62 in rotational directions 70, 72 will move support members 32, 34 along arcuate path 38 simultaneously.

Figure 5:
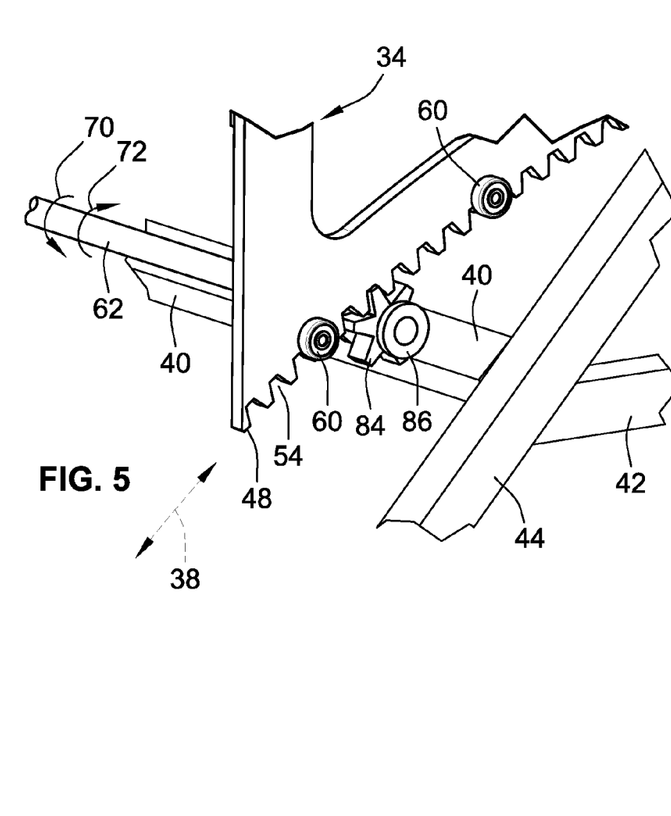
FIG. 5 is a perspective view of another portion of the drive arrangement of the embodiment of FIG. 1.

Turning now to FIG. 5, to facilitate this simultaneous operation, another pinion gear 84 is mounted to drive shaft 62 at an end opposite the end at which pinion gear 64 is mounted. Pinion gear 84 meshes with teeth 54 formed at the lower edge 48 of support member 34. It will also be recognized that housing 52 and track guide 55 have been removed from this view for purposes of clarity and exposing the meshed contact between pinion gear 84 and teeth 54 of support member 34. Track housing 52 includes apertures in its sidewalls for passage of drive shaft 62 through track housing 52. Track housing 52 also includes an internal cavity therein in which pinion gear 84 and a portion of drive shaft 62 are situated. An opening or other clearance feature is provided in a bottom of track guide 55 to allow for the meshing contact between pinion gear 64 and teeth 54 formed on support member 34 as shown. Rotation of drive shaft 62 in rotational directions 70, 72 will move support member 34 along arcuate path 38. Similar to that described relative to FIG. 4, appropriate bushings 86 and other hardware may also be incorporated to mount drive shaft 62 within track housing 52 (See FIG. 2) to stabilize drive shaft 62. Although not illustrated, in certain embodiments, a secondary input drive 60 may also be incorporated at the other end of drive shaft 62. Such a secondary input drive 60 may work in concert with input drive 60 illustrated in FIG. 5 to provide additional mechanical advantage in moving support members 32, 34.

Further, it is also possible to include a separate, second, drive shaft and associated pinion gears. In such an embodiment, such a second drive shaft and pinion gears may be located at the other end of each support member 32, 34 and thus opposite the location of the current drive shaft 62 and pinion gears 64, 84. This second drive shaft may also include its own independent drive unit, or in addition or alternatively be slaved for rotation to drive shaft 62 using belts, timing chains, idler gears, or any equivalent thereof. Yet further, instead of incorporating an additional drive shaft, only additional pinion gears may be located at the other ends of support members 32, 34 opposite the end at which pinion gears 64, 84 are currently located. These additional pinion gears may be independently driven, or in addition or alternatively be slaved for rotation to drive shaft 62 using belts, timing changes, idler gears or any equivalent thereof. Additional housing structures that may be similar to track housing 52 may be employed for purposes of mounting the additional drive shaft with pinion gears or the additional pinion gears alone. It will be recognized that in such embodiments that incorporate additional drive shafts and pinion gears, or only additional pinion gears, support members 32, 34 may be transitioned along the arcuate path to one side or the other side of the vehicle to allow for greater flexibility in deployment.

Each pinion gear 64, 84 may be attached to drive shaft 62 via a spline connection, or any other type of mechanical connection that will prevent relative motion of pinion gears 64, 84 relative to drive shaft 62. Some examples are keyways, welding; etc. Also, although illustrated as arranged on one side of utility rack 20, drive arrangement 36 may be incorporated on the other side of utility rack 20 and achieve the foregoing operation equally well. Furthermore, drive arrangement 36 may also include an electronic controller (not illustrated) in instances where it is motorized to monitor and control the operation of utility rack 20. Those skilled in the art will recognize that such a feature could enable push button operation of utility rack 20 locally or remotely via a remote control.

Figure 6:
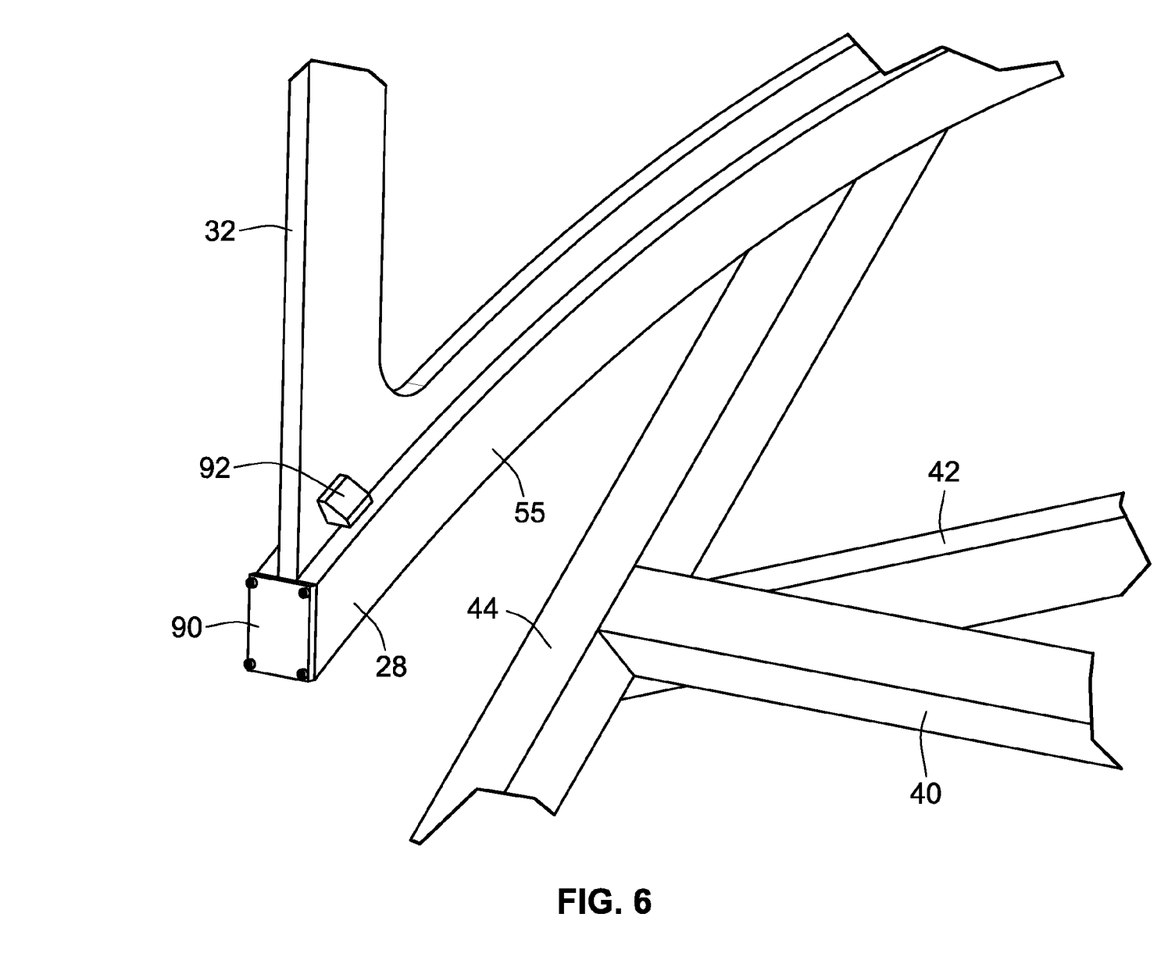
FIG. 6 is a perspective view of a first stop of a stopping arrangement of the embodiment of FIG. 1.

Turning now to FIG. 6, utility rack 20 can also incorporate a stopping arrangement for limiting the maximum travel of support members 32, 34 along arcuate path 38 (See FIG. 2). The stopping arrangement includes first stops 90 positioned at the ends of track assemblies 28, 30. One of first stops 90 is illustrated in FIG. 6 in the context of track assembly 28. As can be seen in this view, first stop 90 caps an end of track assembly 28 such that channel 56 (See FIG. 3) is closed off. As a result, continued motion of support member 32 beyond this end of track assembly 28 illustrated in FIG. 6 is prevented. A like configuration is utilized in the context of track assembly 30, although not illustrated for purposes of brevity. It will be recognize that in those embodiments described above that allow for deployment of support members 32, 34 on either side of a vehicle, that this first stop 90 will be omitted to allow support members 32, 34 to move out of either end of track guides 55.

Figure 7:
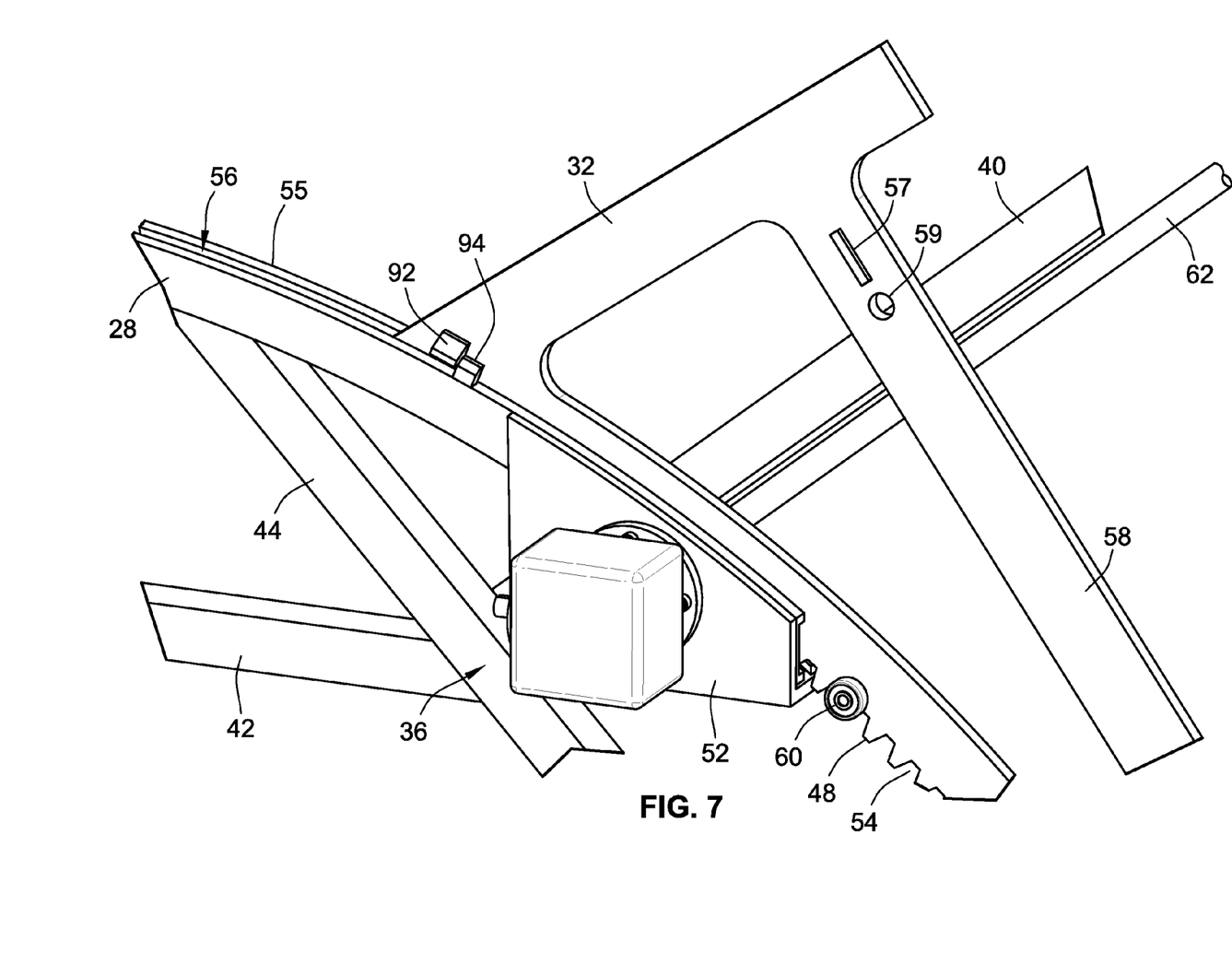
FIG. 7 is a perspective view of a second stop of the stopping arrangement of the embodiment of FIG. 1.

Turning now to FIG. 7, one of two second stops of the aforementioned stopping arrangement is illustrated therein. The other of the two second stops is identical to that illustrated in FIG. 7, but is formed on the other support member 34 and track assembly 30. The second stop includes first and second stop elements 92, 94. The first stop element 92 is formed on a lateral surface of support member 32, while the second stop member 94 is formed on a top surface of track assembly 28.

As can been seen from inspection of FIG. 7, first and second stop elements 92, 94 will come into abutted contact once a predetermined maximum amount of travel along arcuate path 38 (See FIG. 2) of support member 32 has been reached. At this point, further motion of support member 32 relative to track assembly 28 is prevented. This functionality advantageously minimizes or prevents support members 32, 34 from falling completely out of track assemblies 28, 30. Additional stops on each support member 32, 34 and its respective associated track guide 55 may also be employed in those embodiments described above that allow for deployment of support members 32, 34 on either side of a vehicle.

It will also be recognized that in addition or in the alternative to the stopping arrangement discussed above, electronic limit switches and/or position sensors may also be employed to detect the position of support members 32, 34 and shut the system down or reverse the direction of movement of support members 32, 34 upon the detection of a given condition.

To facilitate its low cost advantages, utility rack 20 may be manufactured from readily available tubular or channel-type metal stock such as aluminum stock or the like. Those skilled in the art, however, will recognize that other more robust materials may be selected where relatively large loading conditions are expected.

As described herein, utility rack 20 overcomes existing problems of prior designs by providing a ergonomic system which situates equipment 24 at or below shoulder/head height of a user, and in some cases below the lower most edge 50 of a truck bed 22, to permit the easy loading and unloading of said equipment. This functionality is achieved in part by the compact low cost mechanism which minimizes its componentry but nevertheless effectuates the simultaneous synchronized movement of multiple support members 32, 34.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A movable utility rack, comprising:
    a base structure configured for mounting to a vehicle, the base structure defining a front end and a rear end;
    a first track assembly defining a channel and mounted at the front end;
    a second track assembly defining a channel and mounted at the rear end;
    a first support member slidably received within the channel of the first track assembly;
    a second support member slidably received within the channel of the second track assembly;
    a drive arrangement operably connected to the first and second support members to move the first and second support members relative to the channels of the first and second track assemblies along an arcuate path;
    wherein a plurality of gear teeth are formed along a bottom edge of each of the first and second support members;
    wherein each of the first and second support members includes a plurality of roller bearings extending outwardly therefrom for guiding the first and second support members within the channels defined by the first and second track assemblies, respectively.

2. The movable utility rack of claim 1, wherein the first and second track assemblies have a curved shape at a first radius of curvature.

3. The movable utility rack of claim 2, wherein the first and second support members each have a curved bottom edge at a second radius of curvature that is substantially equal to the first radius of curvature.

4. The movable utility rack of claim 1, wherein the drive arrangement includes an input drive coupled to a drive shaft for rotating the drive shaft in first and second rotational directions.

5. The movably utility rack of claim 4, wherein the drive arrangement includes first and second pinion gears fixedly mounted to the drive shaft, the first pinion gear meshing with the plurality of teeth formed on the curved bottom edge of first support member, the second pinion gear meshing with the plurality of teeth formed on the curved bottom edge of the second support member.

6. The movable utility rack of claim 1, wherein the drive arrangement includes a slip clutch.

7. The movable utility rack of claim 1, wherein each of the first and second track assemblies includes a track housing and a track guide mounted within an interior of the track housing.

8. The movable utility rack of claim 1, wherein the plurality of roller bearings of each of the first and second support members, makes rolling contact with a contact surface defined by the track guide of each of the first and second track assemblies, respectively.

9. The movable utility rack of claim 1, further comprising a stopping arrangement for limiting travel of the first and second support members along the arcuate path.

10. A movable utility rack, comprising:
    a base frame;
    a first track assembly mounted to the base frame and defining a channel;
    a second track assembly mounted to the base frame and defining a channel;
    a first support member carried by the first track assembly within the channel thereof;
    a second support member carried by the second track assembly within the channel thereof;
    a drive arrangement comprising a drive shaft that is commonly connected to both of the first and second support members such that rotation of the drive shaft results in simultaneous movement of the first and second support members;
    wherein each of the first and second support members includes a lower edge with a plurality of teeth formed thereon; and
    wherein each of the first and second support members includes a plurality of roller bearings extending outwardly therefrom for guiding the first and second support members within the channels defined by the first and second track assemblies, respectively.

11. The movable utility rack of claim 10, wherein the drive shaft is rotatable in a first rotational direction to simultaneously transition the first and second support members from a raised position to a lowered position along an arcuate path, and wherein the shaft is rotatable in a second direction to simultaneously transition the first and second support members from the lowered position to the raised position along the arcuate path.

12. The movable utility rack of claim 11, further comprising a stopping arrangement for limiting travel of the first and second support members along the arcuate path.

13. The movable utility rack of claim 12, wherein the stopping arrangement comprises a first stop mounted at an end of each of the first and second track assemblies, the first top preventing continued movement of the first and second support members along the arcuate path beyond a fully raised position.

14. The movable utility rack of claim 13, wherein the stopping arrangement further comprises a first stopping element formed on each of the first and second support members, and a second stopping element formed on each of the first and second track assemblies, wherein the first stopping element abuts the second stopping element to prevent continued movement of the first and second support members along the arcuate path beyond a fully lowered position.

15. The movable utility rack of claim 10, wherein the drive shaft is commonly connected to the first and second support members by a first and second pinion gear, respectively, the first and second pinion gears fixedly mounted on the drive shaft for rotation therewith.

16. The movable utility rack of claim 15, wherein each of the plurality of teeth formed on the first and second support members mesh with the first and second pinions, respectively.

17. The movable utility rack of claim 16, wherein the drive arrangement includes an input drive for rotating the drive shaft.

18. The movable utility rack of claim 17, wherein the drive arrangement includes a slip clutch for preventing rotation of the drive shaft at a predetermined torque.

* * * * *